United States Patent
Park et al.

(10) Patent No.: US 10,635,137 B2
(45) Date of Patent: Apr. 28, 2020

(54) FOLDABLE ELECTRONIC DEVICE COMPRISING FLEXIBLE DISPLAY

(71) Applicant: Samsung Electronics Co., Ltd, Suwon-si (KR)

(72) Inventors: Hyunsub Park, Yongin-si (KR); Wanho Roh, Seoul (KR); Jonghoon Lim, Suwon-si (KR); Daehyun Kim, Hwaseong-si (KR); Hoseong Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/332,781

(22) PCT Filed: Sep. 6, 2017

(86) PCT No.: PCT/KR2017/009742
§ 371 (c)(1),
(2) Date: Mar. 12, 2019

(87) PCT Pub. No.: WO2018/048183
PCT Pub. Date: Mar. 15, 2018

(65) Prior Publication Data
US 2019/0361501 A1    Nov. 28, 2019

(30) Foreign Application Priority Data

Sep. 12, 2016    (KR) .................. 10-2016-0117163

(51) Int. Cl.
*G06F 1/16*    (2006.01)
*G02B 5/32*    (2006.01)
(Continued)

(52) U.S. Cl.
CPC ............. *G06F 1/1652* (2013.01); *G02B 5/32* (2013.01); *G02B 13/06* (2013.01); *G02B 27/22* (2013.01);
(Continued)

(58) Field of Classification Search
CPC .... G06F 1/1605; G06F 1/1607; G06F 1/1641; G06F 1/1652; G06F 1/1677;
(Continued)

(56) References Cited

U.S. PATENT DOCUMENTS 9,317,198 B2 *    4/2016    Kwak .................... G06F 3/017
9,386,300 B2 *    7/2016    Lee ......................... H04N 5/247
(Continued)

FOREIGN PATENT DOCUMENTS

KR    10-2014-0046343 A    4/2014
KR    10-2015-0109992 A    10/2015
(Continued)

OTHER PUBLICATIONS

International Search Report dated Dec. 12, 2017 in connection with International Patent Application No. PCT/KR2017/009742, 2 pages.
(Continued)

*Primary Examiner* — Nidhi Thaker

(57) ABSTRACT

An electronic device according to various embodiments can provide a structure capable of imparting a physical optical effect to a camera unit of a foldable electronic device to which a flexible display is applied. An electronic device according to various embodiments may comprise: a lens unit placed in a partial area of a first side, which does not include a flexible display, through the first side and a second side; a first imaging unit which, when the first side is divided into a first area and a second area on the basis of an axis, is placed adjacent to the first area in which the lens unit is placed; and a second imaging unit which is placed in at least a partial
(Continued)

area of the second side and is configured to be combined on the same optical axis with the lens unit when the electronic device is folded on the basis of the axis. In addition, other embodiments are possible.

15 Claims, 18 Drawing Sheets

(51) Int. Cl.
| | | |
|---|---|---|
| *G02B 13/06* | (2006.01) | |
| *G02B 27/22* | (2018.01) | |
| *G03B 9/02* | (2006.01) | |
| *G03B 13/02* | (2006.01) | |

(52) U.S. Cl.
CPC ............ *G03B 9/02* (2013.01); *G06F 1/1641* (2013.01); *G06F 1/1677* (2013.01); *G06F 1/1684* (2013.01); *G06F 1/1686* (2013.01); *G03B 13/02* (2013.01); *G06F 1/1605* (2013.01); *G06F 1/1607* (2013.01)

(58) Field of Classification Search
CPC ....... G06F 1/1686; G06F 1/1684; G02B 5/32; G02B 13/06; G02B 27/22; G03B 9/02
See application file for complete search history.

(56) References Cited

U.S. PATENT DOCUMENTS

| | | | |
|---|---|---|---|
| 9,864,410 B2 * | 1/2018 | La | ............. G06F 1/1652 |
| 2012/0147193 A1 | 6/2012 | Tsai | |
| 2013/0177304 A1 | 7/2013 | Chapman et al. | |
| 2014/0101578 A1 | 4/2014 | Kwak et al. | |
| 2014/0152576 A1 * | 6/2014 | Kim | ............. G06F 1/1677 |
| | | | 345/169 |
| 2016/0026219 A1 | 1/2016 | Kim et al. | |
| 2016/0050408 A1 | 2/2016 | Lee et al. | |
| 2016/0187994 A1 | 6/2016 | La et al. | |
| 2018/0164852 A1 | 6/2018 | Lim et al. | |
| 2019/0033927 A1 * | 1/2019 | Youm | ............ G06F 1/1618 |
| 2019/0259351 A1 * | 8/2019 | Yoon | ............ H01L 27/3269 |

FOREIGN PATENT DOCUMENTS

| | | |
|---|---|---|
| KR | 10-2016-0013748 A | 2/2016 |
| KR | 10-2016-0021497 A | 2/2016 |
| KR | 10-2016-0097034 A | 8/2016 |

OTHER PUBLICATIONS

Written Opinion of the International Searching Authority dated Dec. 12, 2017 in connection with International Patent Application No. PCT/KR2017/009742, 5 pages.

\* cited by examiner

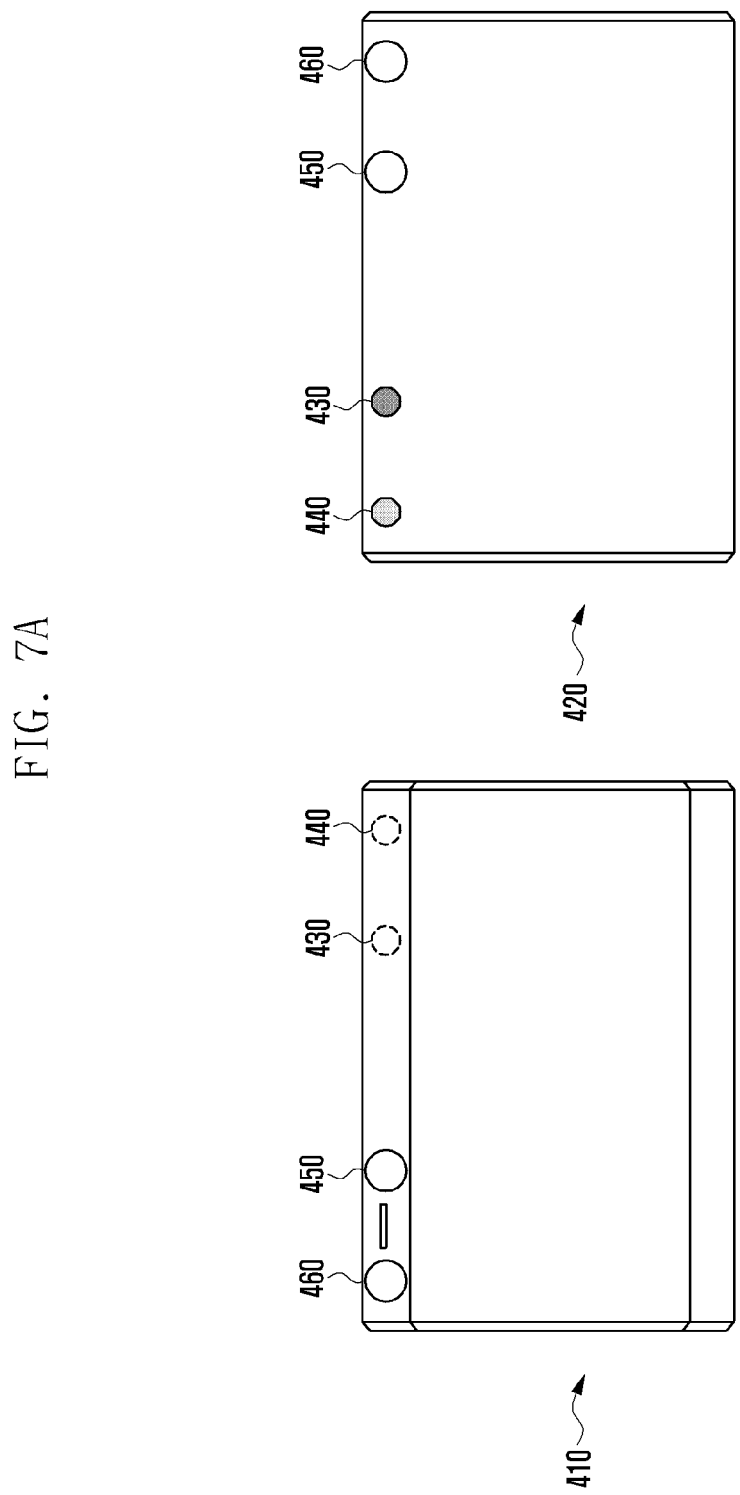

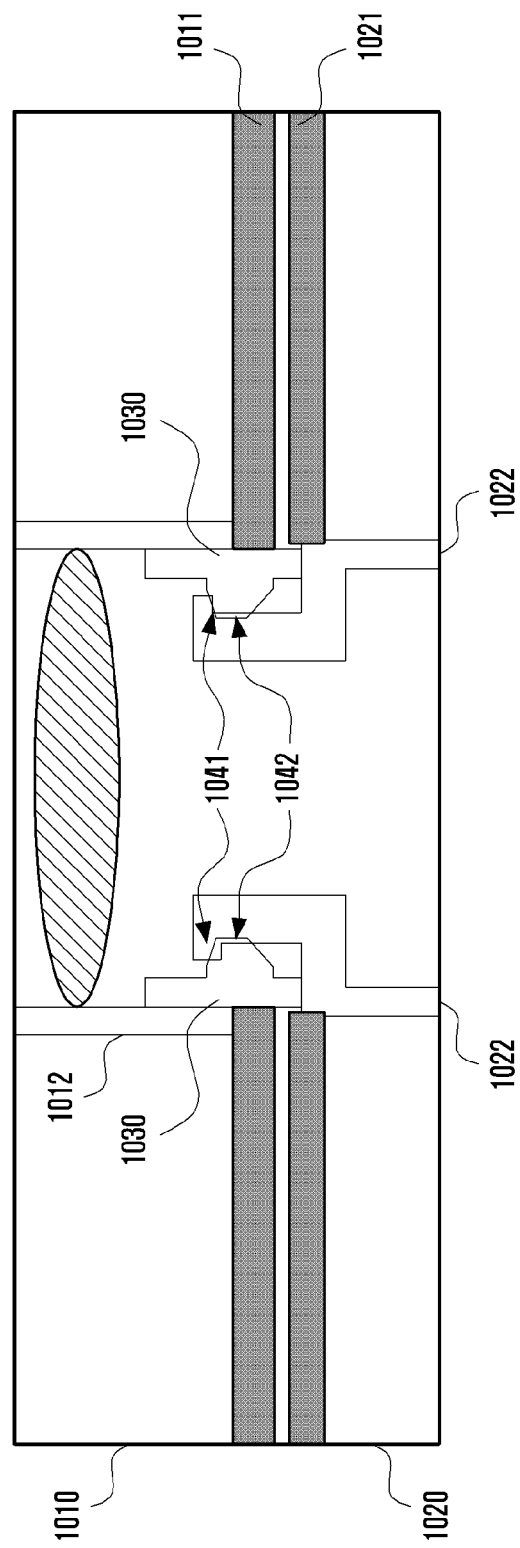

FOLDABLE ELECTRONIC DEVICE COMPRISING FLEXIBLE DISPLAY

CROSS-REFERENCE TO RELATED APPLICATIONS

This application is a 371 of International Application No. PCT/KR2017/009742 filed on Sep. 6, 2017, which claims priority to Korean Patent Application No. 10-2016-0117163 filed on Sep. 12, 2016, the disclosures of which are herein incorporated by reference in their entirety.

BACKGROUND

1. Field

Various embodiments of the disclosure relate to a foldable electronic device including a flexible display, particularly, to a structure having at least one imaging unit and lens unit in a foldable electronic device including a flexible device.

2. Description of Related Art

Recently, products employing a flexible display in an electronic device have been developed. Flexible displays can be mounted in various ways in electronic devices because of free flexibility, and particularly, there are attempts to apply flexible displays to electronic devices such as a smart phone, a tablet PC, a portable multimedia player (PMP), a personal digital assistant (PDA), a laptop personal computer (PC), and wearable devices such as a wrist watch and a head-mounted display (HMD).

When a flexible display is mounted in a foldable electronic device, it can be folded and unfolded with the electronic device when the electronic device is folded and unfolded. Further, foldable electronic devices including a flexible display can be changed in structure such as bending and folding.

SUMMARY

Electronic devices such as a mobile phone or a tablet PC may include camera units. In order to give various optical effects to such camera units, there are methods of additionally processing image data stored after imaging using software and a method of operating a high-definition camera before and/or simultaneously with imaging. However, the method of processing image data stored after imaging has a limit that it cannot obtain high-quality images and the method of using a high-definition camera has a mechanical limit that it is difficult to apply to portable devices. An attachable or replaceable lens or filter is required to give a physical optical effect to camera units, but they increase the thickness and volume of portable devices and deteriorate portability, so they may be difficult to apply to light and thin portable devices.

An electronic device according to various embodiments of the present disclosure can provide a structure that can give a physical optical effect to camera units of foldable electronic devices including a flexible display.

A foldable electronic device according to various embodiments has a first side including a flexible display and a second side disposed opposite to the first side and can be at least partially folded with respect to an axis. The foldable electronic device may include: a lens unit disposed in a partial region of the first side not including the flexible display through the first side and the second side; a first imaging unit disposed adjacent to a first region in which the lens unit is disposed, when the first side is divided into the first region and a second region with respect to the axis; and a second imaging unit disposed in at least partial region of the second side and combined with the lens unit on the same optical axis when the electronic device is folded with respect to the axis.

A foldable electronic device according to various embodiments has a first side including a flexible display and a second side disposed opposite to the first side and can be at least partially folded with respect to an axis. The electronic device may include: a first lens unit disposed in a partial region of the first side not including the flexible display through the first side and the second side; a second lens unit disposed through the first side and the second side, adjacent to a first region in which the first lens unit is disposed, when the first side is divided into the first region and a second region with respect to the axis; a first imaging unit disposed in at least a partial region of the second side and combined with the first lens unit on the same optical axis when the electronic device is folded with respect to the axis; and a second imaging unit disposed in another region of the second side where the first imaging unit is disposed, and combined with the second lens unit on the same optical axis when the electronic device is folded with respect to the axis.

A foldable electronic device according to various embodiments has a first side including a flexible display and a second side disposed opposite to the first side and can be at least partially folded with respect to an axis. The electronic device may include: a first lens unit disposed in a partial region of a first region not including the flexible display through the first side and the second side when the first side is divided into the first region and a second region with respect to the axis; a second lens unit disposed through the first side and the second side in a partial region of the second region not including the flexible display; a first imaging unit disposed in at least a partial region of the second side and combined with the first lens unit on the same optical axis when the electronic device is folded with respect to the axis; and a second imaging unit disposed in another region of the second side where the first imaging unit is disposed, and combined with the second lens unit on the same optical axis when the electronic device is folded with respect to the axis.

Embodiments of the disclosure can provide a structure having at least one imaging unit and lens unit that can be combined when an electronic device is folded, and an imaging method in various modes according to the structure.

Further, embodiments of the present disclosure can provide a combination structure that prevents a space when at least one lens unit and imaging unit are combined when an electronic device is folded.

Further, embodiments of the present disclosure can provide a shutter that can open/close a lens unit disposed through a first side and a second side of an electronic device, depending on the degree of folding of the electronic device.

BRIEF DESCRIPTION OF THE DRAWINGS

FIGS. 7A and 7B are views showing arrangement of an imaging unit and a lens unit of an electronic device according to various embodiments of the disclosure;

FIGS. 10A and 10B are views showing a combination structure of a lens unit and an imaging unit of an electronic device according to various embodiments of the disclosure;

DETAILED DESCRIPTION

Figure 1:
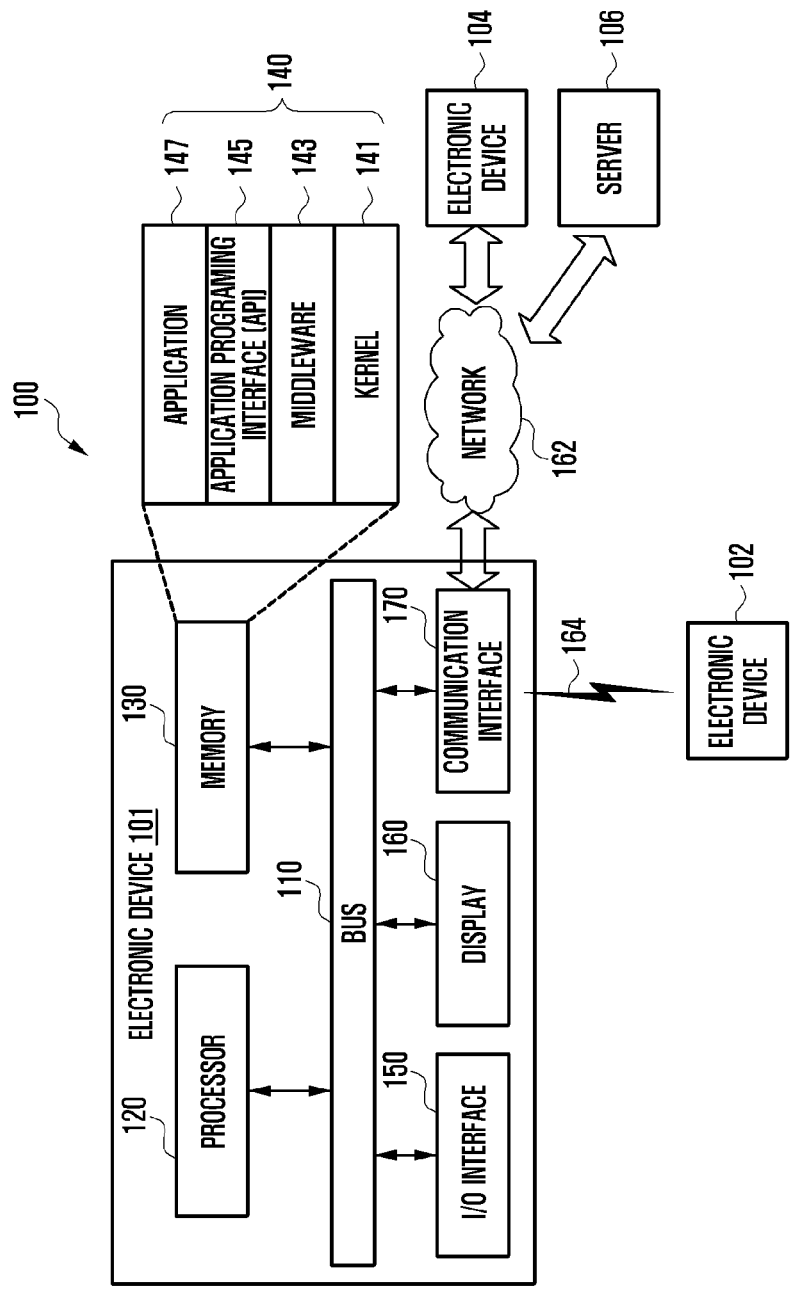
FIG. 1 is a diagram showing a network environment including an electronic device according to various embodiments of the disclosure.

Hereinafter, various embodiments of the present document will be described with reference to the accompanying drawings. The various embodiments of the present disclosure are not limited to a specific implementation form and it should be understood that the present disclosure includes all changes and/or equivalents and substitutes included in the spirit and scope of various embodiments of the present disclosure. In connection with descriptions of the drawings, similar components are designated by the same reference numeral. Singular forms are intended to include plural forms unless the context clearly indicates otherwise. In this document, the expressions such as "A or B" or "at least one of A and/or B" may include any or all of combinations of words listed together. The expression "1", "2", "first", or "second" used in various embodiments of the present disclosure may modify various components of the various embodiments but does not limit the corresponding components. When it is stated that a component is "coupled to" or "connected to" another component, the component may be directly coupled or connected to another component or a new component may exist between the component and another component.

In the present document, depending on the situation, the expression such as "~ configured to" can be used interchangeably with "~ suitable for", "having ~ the ability to", "~ changed to", "~ made to", "capable of ~", or "designed to ~" in hardware or software. In some situations, the expression such as "a device configured to ~" may mean that the device is capable of "doing with" other devices or components. For example, the phrases "a processor configured (or, configured to) perform a, b, and c" may mean that a dedicated processor (e.g., embedded processor) for performing the corresponding operation or a general purpose processor (e.g., CPU or application processor) capable of performing the operations by executing one or more software programs stored in the memory device.

An electronic device according to various embodiments of the present document may include various devices such as, for example, smart phones, tablet PCs, mobile phones, videophones, electronic book readers, desktop PCs, laptop PCs, netbook computers, workstations, a server, a PDA, a portable multimedia player (PMP), an MP3 player, a medical device, a camera, or a wearable device. A wearable device may include at least one of an accessory type such as a watch, a ring, a bracelet, a necklace, a pair of glasses, a contact lens or a head-mounted-device (HMD), a fabric or a garment integral type (e.g., electronic garment), a body attachment type (e.g., a skin pad or a tattoo), or a bio implantable circuit. According to some embodiments, the electronic device may include, for example, at least one of a television, a digital video disk (DVD) player, an audio player, a refrigerator, an air conditioner, a vacuum cleaner, an oven, a microwave oven, a washing machine, an air cleaner, a set top box, a home automation control panel, a media box (e.g., Samsung HomeSync™, Apple TV™, or Google TV™), a game console (e.g., Xbox™, PlayStation™), an electronic dictionary, an electronic key, a camcorder, or an electronic frame.

In another embodiment, the electronic device may include at least one of any of a variety of medical devices (for example, various portable medical measurement devices (e.g., a blood glucose meter, a heart rate meter, a blood pressure meter or a temperature measuring device), a magnetic resonance angiography (MRA), a magnetic resonance imaging (MRI), computed tomography (CT), an imaging device, or an ultrasonic device), navigation devices, global navigation satellite system (GNSS), event data recorder (EDR), flight data recorder (FDR), automobile infotainment device, marine electronic devices (e.g., marine navigation devices, gyro compass, etc.), avionics, security devices, car head units, industrial or home robots, drones, ATMs at financial institutions, points of sale (POS) of stores or Internet Of Things devices (e.g., a light bulb, various sensors, a sprinkler device, a fire alarm, a thermostat, a streetlight, a toaster, a fitness device, a hot water tank, a heater, a boiler, etc.). According to some embodiments, the electronic device may include at least one of a piece of furniture, a building/structure, a part of an automobile, an electronic board, an electronic signature receiving device, a projector, or a variety of measuring devices (e.g., gas, or radio wave measuring instruments, etc.). In various embodiments, the electronic device is flexible or may be a combination of two or more of the various devices described above. The electronic device according to the embodiment of the present document is not limited to the above-described devices. In this document, the term "user" used in various embodiments may refer to a person who uses an electronic device or a device (for example, an artificial intelligence electronic device) which uses an electronic device.

FIG. 1 illustrates a network environment 100 including an electronic device 101 according to various embodiments of the present disclosure. The electronic device 101 includes a bus 110, a processor 120, a memory 130, a input/output interface 150, a display 160 and a communication interface 170. According to some embodiments, the electronic device 101 may omit at least one of the components, or may additionally comprise other components. The bus 110 may be a circuit connecting the above described components 110 to 170 and transmitting communication (for example, a control message or data) between the above described components. The processor 120 may include one or more of a central processing unit (CPU), an application processor (AP), or a communications processor (CP). The processor 120 may execute operations or data processing related to control and/or communicate at least one the other components of the electronic device (101).

The memory 130 may include volatile and/or non-volatile memory. For example, the memory 130 may store instructions or data related to at least one other component of the electronic device 101. According to one embodiment, the memory 130 may store software and/or programs 140. For example, the program 140 may include a kernel 141, a middleware 143, an application programming interface (API) 145, and/or an application program (or application) 147. At least one of the kernel 141, middleware 143, or API 145 may be referred to as an operating system. For example, the kernel 141 controls or manages system resources (e.g., bus 110, processor 120, or memory 130, etc.) used for executing an operation or function implemented by the remaining other programming modules, for example, the middleware 143, the API 145, or the application 147. Further, the kernel 141 provides an interface for accessing individual components of the electronic device 101 from the middleware 143, the API 145, or the application 147 to control or manage the components.

The middleware 143 performs a relay function of allowing the API 145 or the application 147 to communicate with the kernel 141 to exchange data. Further, in operation requests received from the application 147, the middleware 143 performs a control for the operation requests by using a method of assigning a priority. For example, the middleware 143 performs a control for the operation requests by using a method of assigning a priority by which system resources (for example, the bus 110, the processor 120, the memory 130 and the like) of the electronic device 100 can be used, to the application 147. The API 145 is an interface by which the application 147 can control a function provided by the kernel 141 or the middleware 143 and includes, for example, at least one interface or function (for example, command) for a file control, a window control, image processing, or a character control. The input/output interface 150 can receive, for example, a command and/or data from a user or external device, and transfer the received command and/or data to the components of the electronic device 101. The input/output interface 150 can output the received command and/or data to the components of the user or the external device.

The display 160 may include a display device such as a liquid crystal display (LCD), a light emitting diode (LED) display, an organic light emitting diode (OLED) display, or a microelectromechanical system (MEMS) display, or an electronic paper display. The display 160 may display various content (e.g., text, images, video, icons, and/or symbols, etc.) to a user. The display 160 may include a touch screen and may receive a touch, gesture, proximity, or hovering input using an electronic pen or a portion of a user's body. The communication interface 170 connects communication between the electronic device 100 and the external device (e.g., electronic device 102, 104 or server 106). For example, the communication interface 170 may access a network 162 through wireless or wired communication to communicate with the external device (e.g., the second electronic device 104 or server 106).

The wireless communication may include, for example, at least one of LTE, LTE-A (LTE Advance), code division multiple access (CDMA), wideband CDMA (WCDMA), universal mobile telecommunications system (UMTS), WiBro System for Mobile Communications). According to one embodiment, the wireless communication may include, for example, at least one of wireless fidelity (WiFi), Bluetooth, Bluetooth low power (BLE), Zigbee, near field communication, Magnetic Secure Transmission, Frequency (RF), or body area network (BAN). According to one example, wireless communication may include Global navigation satellite system (GNSS). For example, the GNSS may be a Global Positioning System (GPS), a Global Navigation Satellite System (Glonass), a Beidou Navigation Satellite System (Beidou), or a Galileo, the European global satellite-based navigation system. Hereinafter, the term 'GPS' can be used interchangeably with the term 'GNSS' in this document. The wired communication may include, for example, at least one of a universal serial bus (USB), a high definition multimedia interface (HDMI), a recommended standard 232 (RS-232), a power line communication, or a plain old telephone service (POTS). The network 162 may include at least one of a telecommunications network, a computer network (e.g., LAN or WAN), the Internet, or a telephone network.

Each of the first and second external electronic devices 102 and 104 may be the same or a different kind of device as the electronic device 101. According to various embodiments, all or a portion of the operations performed in the electronic device 101 may be performed in another electronic device or multiple electronic devices (e.g., electronic devices 102, 104, or server 106). According to one embodiment, in the event that the electronic device 101 has to perform certain functions or services automatically or upon request, the electronic device 101 may request other devices to perform at least some of the functions associated therewith instead of performing the function or service itself. Other electronic devices (e.g., the electronic devices 102 and 104, or server 106) may execute the requested function or additional function and transmit the results to electronic device 101. The electronic device 101 can directly or additionally process the received result to provide the requested function or service. For this purpose, for example, cloud computing, distributed computing, or client-server computing technology may be used.

Figure 2:
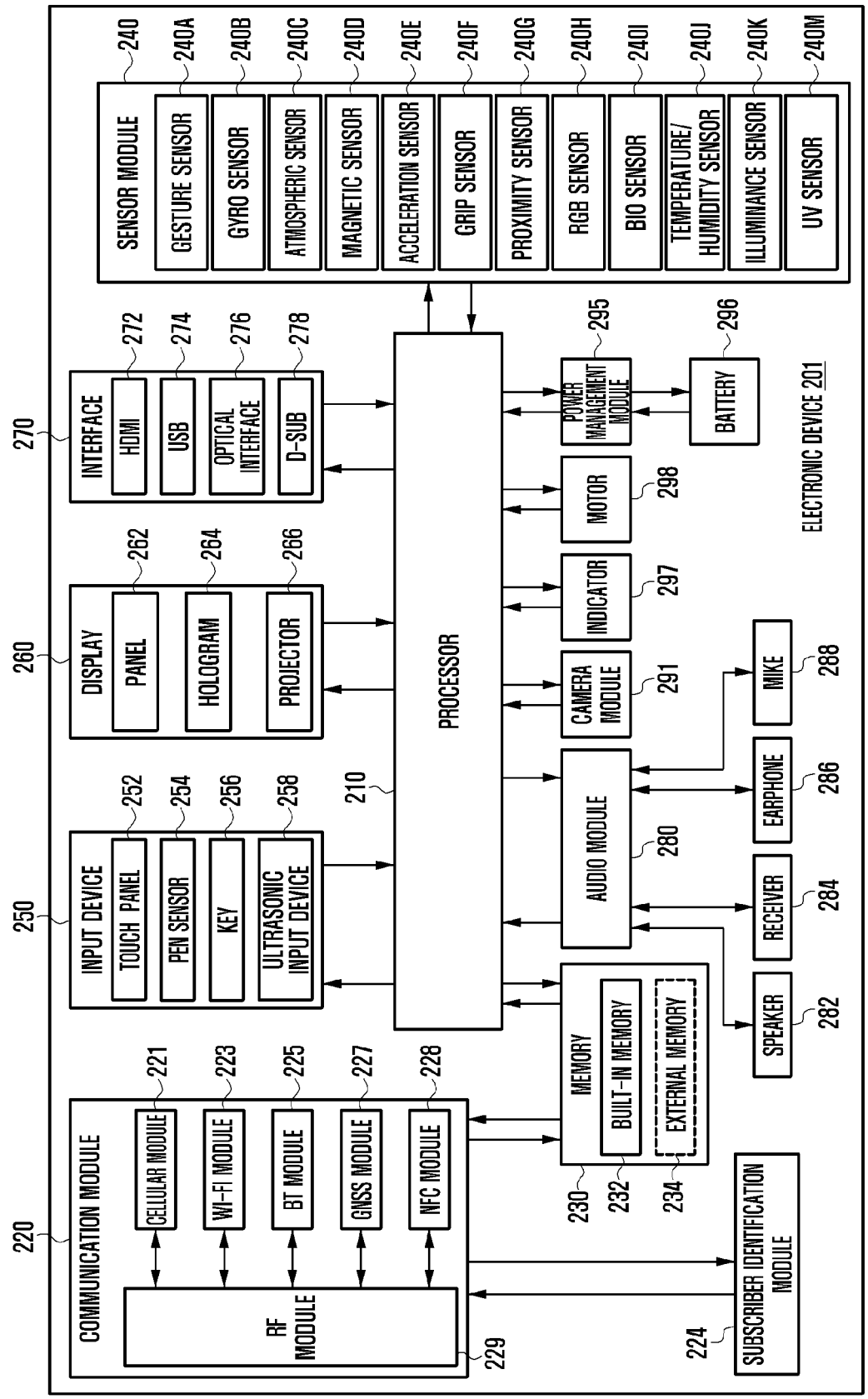
FIG. 2 is a block diagram of an electronic device according to various embodiments of the disclosure.

FIG. 2 is a block diagram of an electronic device 201 according to various embodiments of the present disclosure. The electronic device 201 may configure, for example, a whole or a part of the electronic device 101 illustrated in FIG. 1. The electronic device 201 includes one or more processors (e.g., AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. For example, the processor 210 may operate an operating system (OS) or an application program to control a plurality of hardware or software components connected to the processor 210, and may perform various data processing and operations. The processor 210 may be implemented by, for example, a system on chip (SoC). According to an embodiment, the processor 210 may further include a graphics processing unit (GPU) and/or an image signal processor. The processor 210 may include at least some of the components shown in FIG. 2 (e.g., cellular module 221). The processor 210 may load and process instructions or data received from at least one of the other components (e.g., non-volatile memory) and store the processed data in non-volatile memory.

May have the same or similar configuration as communication module 220 (e.g., communication interface 170). The communication module 220 may include, for example, a cellular module 221, a WiFi module 223, a Bluetooth module 225, a GNSS module 227, an NFC module 228 and an RF module 229 have. The cellular module 221 may provide, for example, voice calls, video calls, text services, or Internet services through a communication network. According to an embodiment, the cellular module 221 may distinguish and authenticate the electronic device 201 within the communication network by using the subscriber identity module (e.g., a SIM card) 224. According to an embodiment, the cellular module 221 performs at least some of the functions which can be provided by the processor 210. According to one embodiment, the cellular module 221 may include a communications processor (CP). At least some (e.g., two or more) of the cellular module 221, the WiFi module 223, the Bluetooth module 225, the GNSS module 227, or the NFC module 228 may be included in one integrated chip (IC) or IC package according to one embodiment. The RF module 229 transmits/receives data, for example, an RF signal. The RF module 229 may include, for example, a transceiver, a Power Amp Module (PAM), a frequency filter, a Low Noise Amplifier (LNA) or the like. According to another embodiment, at least one of the cellular module 221, the WiFi module 223, the Bluetooth module 225, the GNSS module 227, or the NFC module 228 transmits/receives an RF signal through a separate RF module. The SIM card 224 is a card including a Subscriber Identification Module or an embedded SIM. The SIM card 224 includes unique identification information (for example, Integrated Circuit Card IDentifier (ICCID)) or subscriber information (for example, International Mobile Subscriber Identity (IMSI).

The memory 230 (for example, memory 130) may include an internal memory 232 or an external memory 234. The internal memory 232 may include, for example, at least one of a volatile memory (for example, a dynamic Random Access Memory (DRAM), a static RAM (SRAM), a synchronous dynamic RAM (SDRAM), and the like), and a non-volatile Memory (for example, a one time programmable Read Only Memory (OTPROM), a programmable ROM (PROM), an erasable and programmable ROM (EPROM), an electrically erasable and programmable ROM (EEPROM), a mask ROM, a flash ROM, a NAND flash memory, a hard drive, a solid state drive (SSD). The external memory 234 may include a flash drive, for example, a Compact Flash (CF), a Secure Digital (SD), a Micro Secure Digital (Micro-SD), a Mini Secure Digital (Mini-SD), an extreme Digital (xD), a multimedia card (MMC), or a memory stick. The external memory 234 may be functionally connected to the electronic device 201 through various interfaces.

The sensor module 240 measures a physical quantity or detects an operation state of the electronic device 201, and converts the measured or detected information to an electronic signal. The sensor module 240 may include, for example, at least one of a gesture sensor 240A, a gyro sensor 240B, an atmospheric pressure (barometric) sensor 240C, a magnetic sensor 240D, an acceleration sensor 240E, a grip sensor 240F, a proximity sensor 240G, a color sensor 240H (for example, Red, Green, and Blue (RGB) sensor) 240H, a biometric sensor 240I, a temperature/humidity sensor 240J, an illumination (light) sensor 240K, and a Ultra Violet (UV) sensor 240M. Additionally or alternatively, the sensor module 240 may include, for example, a E-nose sensor, an electromyography (EMG) sensor, an electroencephalogram (EEG) sensor, an electrocardiogram (ECG) sensor, an Infra-Red (IR) sensor, an iris sensor, a fingerprint sensor (not illustrated), and the like. The sensor module 240 may further include a control circuit for controlling one or more sensors included in the sensor module 240. According to some embodiments, to control the sensor module 240 while the processor 210 is in the sleep state, the electronic device 201 further includes a processor configured as part of the processor 210 or a processor that is separately configured from the processor 210.

The input device 250 may include, for example, a touch panel 252, a (digital) pen sensor 254, a key 256, and an ultrasonic input device 258. For example, the touch panel 252 may recognize a touch input in at least one type of a capacitive type, a resistive type, an infrared type, and an acoustic wave type. The touch panel 252 may further include a control circuit. The touch panel 252 may further include a tactile layer. In this event, the touch panel 252 provides a tactile reaction to the user. For example, the (digital) pen sensor 254 may be part of the touch panel or may include a separate recognition sheet. The key 256 may include, for example, a physical button, an optical key, or a keypad. The ultrasonic input device 258 is a device which can detect an acoustic wave by a microphone (for example, microphone 288) of the electronic device 200 through an input means generating an ultrasonic signal to identify data and can perform wireless recognition.

The display 260 (for example, display 160) includes a panel 262, a hologram device 264, and a projector 266. The panel 262 may be implemented to be, for example, flexible, transparent, or wearable. The panel 262 may be configured by the touch panel 252 and one module. According to an embodiment, the panel 262 may include a pressure sensor (or force sensor) capable of measuring the intensity of the pressure on the user's touch. The pressure sensor may be integrated with the touch panel 252 or may be implemented by one or more sensors separate from the touch panel 252. The hologram device 264 shows a stereoscopic image in the air by using interference of light. The projector 266 projects light on a screen to display an image. For example, the screen may be located inside or outside the electronic device 200. The interface 270 may include, for example, an HDMI 272, a USB 274, an optical interface 276, or a D-sub (D-subminiature) 278. The interface 270 may be included, for example, in the communication interface 170 shown in FIG. 1. Additionally or alternatively, the interface 270 may include, for example, a mobile high-definition link (MHL) interface, an SD card/multi-media card (MMC) interface, or an infrared data association (IrDA) standard interface.

The audio module 280 bi-directionally converts a sound and an electronic signal. At least some components of the audio module 280 may be included in, for example, the input/output interface 150 illustrated in FIG. 1. The audio module 280 processes sound information input or output through, for example, a speaker 282, a receiver 284, an earphone 286, the microphone 288 or the like. The camera module 291 is a device which can photograph a still image and a video.

According to an embodiment, the camera module 291 may include one or more image sensors (for example, a front sensor or a back sensor), an Image Signal Processor (ISP) (not shown) or a flash (for example, an LED or xenon lamp).

In addition, the camera module 291 according to various embodiments may include at least one imaging unit (430, 440) and at least one lens unit (450, 460) that can be engaged when the electronic device 400 is folded with respect to one axis.

The power managing module 295 manages power of the electronic device 200. The power managing module 295 may include, for example, a Power Management Integrated Circuit (PMIC), a charger Integrated Circuit (IC), or a battery or fuel gauge. The PMIC may have a wired and/or wireless charging method. The wireless charging method may include, for example, a magnetic resonance method, a magnetic induction method and an electromagnetic wave method, and additional circuits for wireless charging, for example, circuits such as a coil loop, a resonant circuit, a rectifier or the like may be added. The battery gauge measures, for example, a remaining quantity of the battery 296, or a voltage, a current, or a temperature during charging. The battery 296 may include a rechargeable battery or a solar battery.

The indicator 297 shows particular statuses of the electronic device 201 or a part (for example, the processor 210) of the electronic device 201, for example, a booting status, a message status, a charging status and the like. The motor 298 converts an electrical signal to a mechanical vibration, and can generate vibration, haptic effects, and the like. The electronic device 200 may include a processing unit (for example, GPU) for supporting a module TV. The processing unit for supporting the mobile TV may process, for example, media data according to a standard of Digital Multimedia Broadcasting (DMB), Digital Video Broadcasting (DVB), mediaFlo™ or the like. Each of the components described in this document may be composed of one or more components, and the name of the component may be changed according to the type of the electronic device. The electronic device according to various embodiments of the present disclosure may include at least one of the above described components, a few of the components may be omitted, or additional components may be further included. Also, some of the components of the electronic device according to various embodiments of the present disclosure may be combined to form a single entity, and thus may equivalently execute functions of the corresponding components before being combined.

Figure 3:
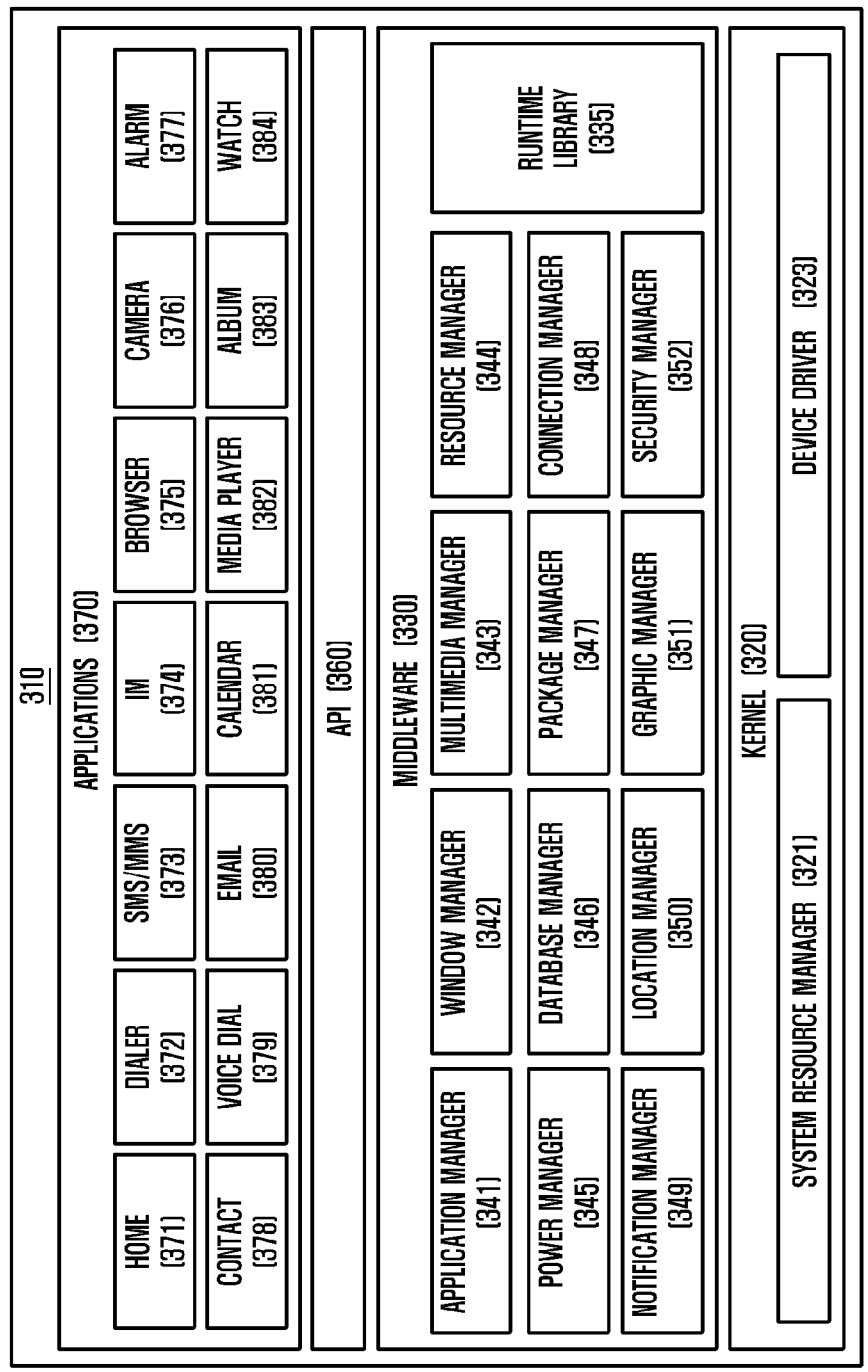
FIG. 3 is a block diagram of a program module according to various embodiments of the disclosure.

FIG. 3 is a block diagram of a programming module according to an embodiment. The programming module 310 may include an Operating System (OS) controlling resources related to the electronic device (for example, electronic device 101) or various applications (for example, applications 370) driving on the OS. For example, the OS may be Android™, Windows™, Symbian™, Tizen™, Bada™ or the like. Referring to FIG. 3, the programming module 310 includes a kernel 320, a middleware 330, an Application Programming Interface (API) 360, and applications 370. At least a portion of the program module 310 is preloaded on the electronic device or downloadable from an external electronic device (e.g., electronic device 102, 104, server 106, etc.).

The kernel 320 (for example, kernel 141) includes a system resource manager 321 and a device driver 323. The system resource manager 321 performs a system resource control, allocation, and recall. According to an embodiment, the system resource manager 321 may include, for example, a process manager, a memory manager, and a file system manager. The device driver 323 may include, for example, a display driver, a camera driver, a Bluetooth driver, a shared memory driver, a USB driver, a keypad driver, a WiFi driver, an audio driver, or an Inter-Process Communication (IPC) driver. The middleware 330 provides various functions through the API 360 to allow the application 370 to provide a function required in common by the applications 370, or use limited system resources within the electronic device. According to an embodiment, the middleware 310 may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352.

The runtime library 335 may include, for example, a library module used by a complier to add a new function through a programming language while the application 370 is executed. According to an embodiment, the runtime library 335 executes input and output, management of a memory, a function associated with an arithmetic function and the like. The application manager 341 manages, for example, a life cycle of at least one of the applications 370. The window manager 342 manages GUI resources used on the screen. The multimedia manager 343 detects a format required for reproducing various media files and performs an encoding or a decoding of a media file by using a codec suitable for the corresponding format. The resource manager 344 manages resources such as a source code, a memory, or a storage space of at least one of the applications 370. The power manager 345 may manage, for example, the capacity or power of the battery and provide the power information necessary for the operation of the electronic device. According to an embodiment, the power manager 345 operates together with a Basic Input/Output System (BIOS). The database manager 346 manages generation, search, and change of a database to be used by at least one of the applications 370. The package manager 347 manages an installation or an update of an application distributed in a form of a package file.

The connection manager 348 manages, for example, a wireless connection. The notification manager 349 displays or notifies a user of an event such as an arrival message, an appointment, a proximity alarm or the like. The location manager 350 may manage, for example, location information of the electronic device. The graphic manager 351 may manage a graphic effect provided to the user or a user interface related to the graphic effect. The security manager 352 provides a general security function required for a system security or a user authentication. According to an embodiment, the middleware 330 may include a telephony manager for managing a voice of the electronic device or a video call function. The middleware 330 may provide a module specified for each type of operating system to provide a differentiated function. The middleware 330 may dynamically delete some of the conventional components or add new components. The API 360 (for example, API 145) is a set of API programming functions, and may be provided with a different configuration according to an operating system. For example, in Android or iOS, a single API set may be provided for each platform. In Tizen, two or more API sets may be provided.

The applications 370 may include a home application 371, a dialer application 372, a Short Messaging Service (SMS)/Multimedia Messaging Service (MIMS) application 373, an Instant Messaging (IM) application 374, a browser application 375, a camera application 376, an alarm application 377, a contact application 378, a voice dial application 379, an email application 380, a calendar application 381, a media player application 382, an album application 383, a clock application 384, a healthcare (e.g., measuring exercise or blood sugar) application, or an environmental information (e.g., pressure, humidity, or temperature information) application. According to an embodiment, the application 370 may include an information exchange application capable of supporting the exchange of information between the electronic device and the external electronic device. The information exchange application may include, for example, a notification relay application for communicating specific information to an external electronic device, or a device management application for managing an external electronic device. For example, the notification relay application may transmit notification information generated in another application of the electronic device to an external electronic device, or may receive notification information from an external electronic device and provide the notification information to the user. The device management application may, for example, install, delete, or update the functions such as turning on/off the external electronic device itself (or some component) or adjusting the brightness (or resolution) of the display of the external electronic device of an external electronic device that communicates with the electronic device, or an application that operates on the external electronic device. According to an embodiment, the application 370 may include an application (e.g., a healthcare application of a mobile medical device) designated according to the attributes of the external electronic device. According to an embodiment, the application 370 may include an application received from an external electronic device. At least some of the program modules 310 may be implemented (e.g., executed) in software, firmware, hardware (e.g., processor 210), or a combination of at least two of the same, and may comprise modules, programs, routines, instruction sets or processes for performing one or more functions.

Figure 4A:
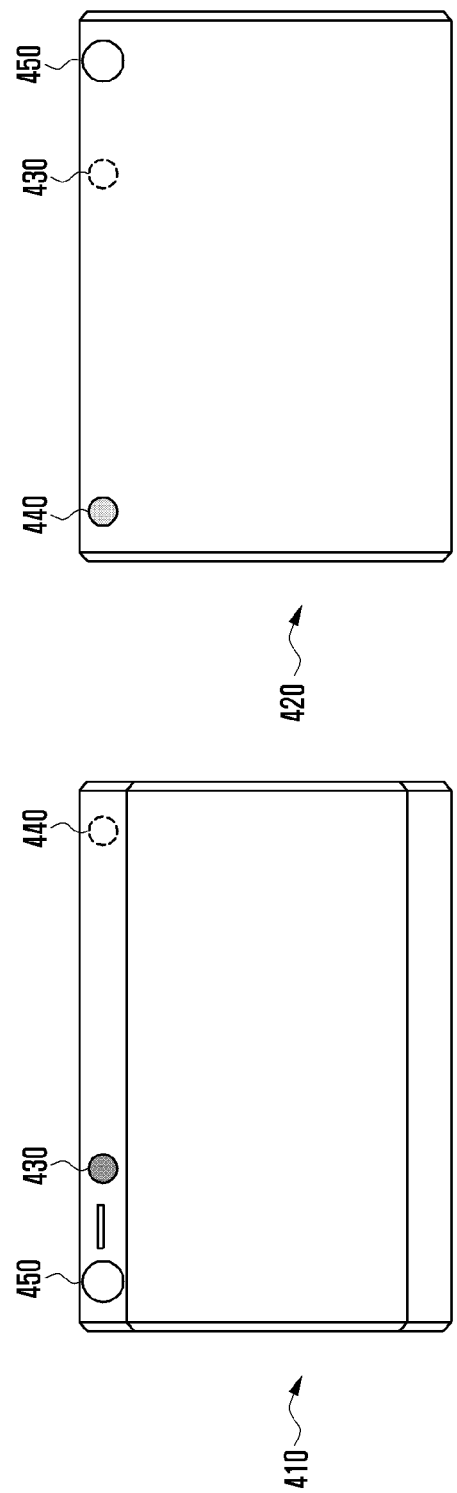
FIGS. 4A and 4B are views showing arrangement of an imaging unit and a lens unit of an electronic device according to various embodiments of the disclosure.
Figure 4B:
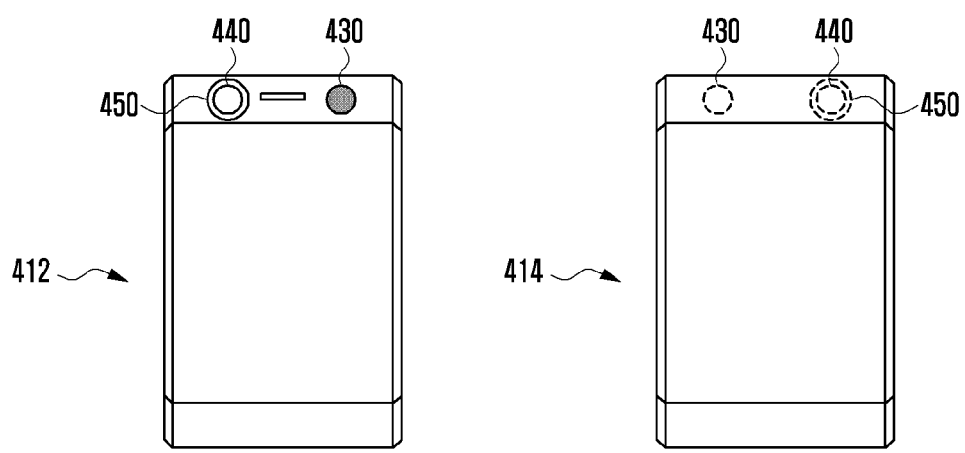

FIGS. 4A and 4B are views showing arrangement of imaging units 430 and 440 and a lens unit 450 of a foldable electronic device 400 including a flexible display according to various embodiments of the disclosure.

The foldable electronic device 400 including a flexible display according to various embodiments of the disclosure can be deformed in accordance with the magnitude and the acting direction of force when external force is applied.

The foldable electronic device 400 including a flexible display according to various embodiments of the disclosure can be structurally deformed such as bending and folding, so when a flexible display is mounted in the electronic device 400, the flexible display can be folded or unfolded with the electronic device 400, as the electronic device 400 is folded or unfolded.

A flexible display according to various embodiments has the characteristic of flexibility and can show various images such as a background image including a contents playback image or icons, an application execution image, and a preview image by imaging.

FIG. 4A is a view showing unfolded states 410 and 420 of the foldable electronic device 400 according to various embodiments and FIG. 4B is a view showing folded states 412 and 414 of foldable electronic device 400 according to various embodiments.

As shown in FIGS. 4A and 4B, the foldable electronic device 400 according to various embodiments may include a first imaging unit 430, a second imaging unit 440, and a lens unit 450.

The lens unit 450 may include a normal standard lens, a wide-angle lens, a telephoto lens, a fish-eye lens having an angle of view of 180°, a microlens designed to enable close-up or macro photography, a zoom lens being able to sequentially change a focal distance, or a mirror lens using a mirror etc. The lens unit 450 may further include an electro-wetting variable-focus liquid lens that can adjust the focus in accordance with an electric field.

The electro-wetting variable-focus liquid lens can adjust the focal distance thereof by changing the curvature of an interface in accordance with the equilibrium wetting condition of the interface, using an electro-wetting phenomenon.

When the lens unit 450 includes an electro-wetting variable-focus liquid lens in accordance with various embodiments, the electronic device can perform imaging in various modes by changing the focus in accordance with user's requirements.

The first imaging unit 430 and the second imaging unit 440 can take still pictures or videos. Though not shown, the first imaging unit 430 and the second imaging unit 440 each may include a lens block that is an optical system including a zoom lens, a focus lens, a diaphragm, etc.

In accordance with various embodiments, when the first imaging unit 430 or the second imaging unit 440 is combined with the lens unit 450 due to folding of the electronic device, the combined lens unit 450 and imaging units 430 and 440 may be arranged on the same optical axis. For example, light from an object can travel through the combined imaging units 430 and 440 after traveling through the lens unit 450.

As shown in FIG. 4A, the foldable electronic device 400 according to various embodiments may include, when it is fully unfolded without folding, that is, in an unfolded state, the first imaging unit 430 on a first side 410, the second imaging unit 440 on a second side 420 opposite to the first side 410 of the electronic device 400, and the lens unit 450 disposed through the first side 410 and the second side 420. If the first side 410 of the electronic device 400 is divided into a first region 412 and a second region 414 with respect to an axis and the region where the lens unit 450 is disposed is the first region 412, the first imaging unit 430 may be disposed in the first region 412 adjacent to the lens unit 450.

Further, as shown in FIG. 4B, when the foldable electronic device 400 according to various embodiments is fully folded with respect to an axis, that is, in a folded state, the second imaging unit 440 may be combined with the lens unit 450 on the same optical axis.

In accordance with various embodiments, the first side 410 of the electronic device 400 in the unfolded state may mean a side including a flexible display, but another display may be included in the second side 420 disposed opposite to the first side 410 in the unfolded state, so the meaning of the first side 410 is not limited thereto.

As shown in FIG. 4A, the electronic device 400 according to various embodiments, in the unfolded state, can perform self-camera mode-imaging through the first imaging unit 430 in the first side 410 and can perform normal mode-imaging through the second imaging unit 430 in the second side 420.

As shown in FIG. 4B, when the electronic device 400 according to various embodiments is fully folded with respect to an axis and performs imaging with the side 412, in which the first imaging unit 430 is disposed, as the front face, the electronic device 400 can perform dual camera mode-imaging using the first imaging unit 430 and, the second imaging unit 440 combined with the lens unit 450. For example, the dual camera mode imaging of the electronic device 400 may be an operation in which two imaging units simultaneously take a picture of a single object.

Meanwhile, though not shown, the electronic device 400 according to various embodiments may further include a third imaging unit in a side 414 disposed opposite to the side 412 in which the first imaging unit 430 is disposed in the folded state.

Figure 5:
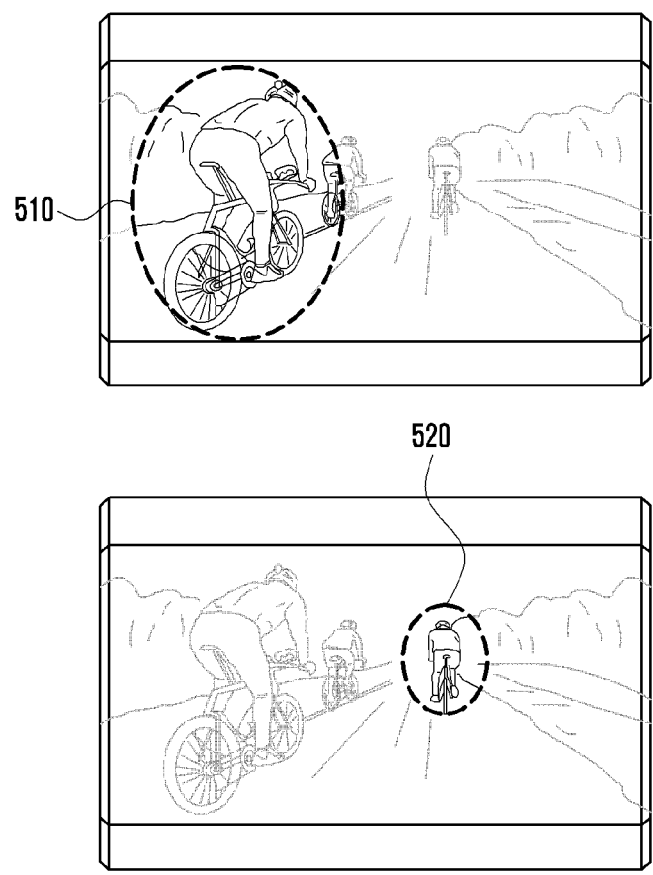
FIG. 5 is a view showing a refocusing function in a special imaging mode according to various embodiments of the disclosure.
Figure 6:
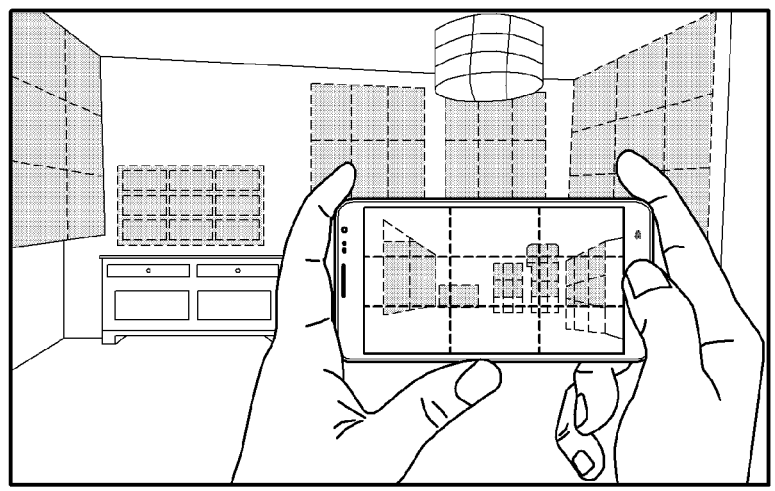
FIG. 6 is a view showing a 3-dimension (3D-) imaging function in a special imaging mode according to various embodiments of the disclosure.

FIGS. 5 and 6 are views showing a refocusing function and a 3-dimension (3D-) imaging function in a special imaging mode according to various embodiments of the disclosure.

When the electronic device 400 according to various embodiments performs imaging in the folded state with the side 412, in which the first imaging unit 430 is disposed, as the front face, the electronic device 400 can perform imaging in the special imaging mode using the first imaging unit 430 and, the second imaging unit 440 combined with the lens unit 450.

For example, in the first imaging unit 430 having a normal view angle and the second imaging unit 440 that can have various view angles by combining with the lens unit 450, when the second imaging unit 440 has a normal view angle and the lens unit 450 has a wide angle, the electronic device 400 can simultaneously obtain images with various view angles through the dual camera mode-imaging.

Further, when the second imaging unit 440 and the lens unit 450 both have a normal view angle or the second imaging unit 440 has a wide angle and the lens unit 450 has a narrow view angle (a narrow conversion lens), the electronic device 400 can enlarge and take a picture of a far object using an optical zoom function and can perform the refocusing function of the 3D-imaging function by configuring a depth map.

For example, when the electronic device 400 performs imaging in the dual camera mode through two imaging units having the same view angle, it is possible to configure a depth map of the images obtained by imaging.

When a depth map of images is configured in accordance with various embodiments, the electronic device 400 can apply the refocusing function through post processing on the obtained images.

In accordance with various embodiments, when the electronic device 400 applies the refocusing function, the electronic device 400 can adjust the focus of an image to an object that a user wants of a plurality of objects in images through the images constituting the depth map.

For example, when the electronic device 400 applies the refocusing function, as shown in FIG. 5, it is possible to move the focus to an object 520 in the image in which an object 510 is focused, in accordance with a user's request.

In accordance with various embodiments, when the electronic device 400 performs 3D-imaging through the dual camera mode, the electronic device 400 can obtain a 3D image, as shown in FIG. 6. Further, in accordance with various embodiments, the electronic device 400 can output distance information between objects and imaging units in the resultant picture through images or videos obtained in the dual camera mode.

The foldable electronic device 400 according to various embodiments may include, in the unfolded state, the lens unit 450 and the first imaging unit 430 in the first side 410 and the second imaging unit 440 in the second side 420 disposed opposite to the first side of the electronic device 400. For example, the electronic device 400 according to various embodiments can perform dual camera mode-imaging using the first imaging unit 430 and, the second imaging unit 440 combined with the lens unit 450 in the folded state.

In accordance with an embodiment, in the dual camera mode of the electronic device 400, when the first imaging unit 430 performs imaging in a monochrome mode and the second imaging unit 440 combined with the lens unit 450 performs imaging in a color mode, a low-illuminance and high-resolution image can be obtained. In accordance with another embodiment, the first imaging unit 430 may perform imaging in a color mode and the second imaging unit 440 combined with the lens unit 450 may perform imaging in a monochrome mode.

Figure 7B:
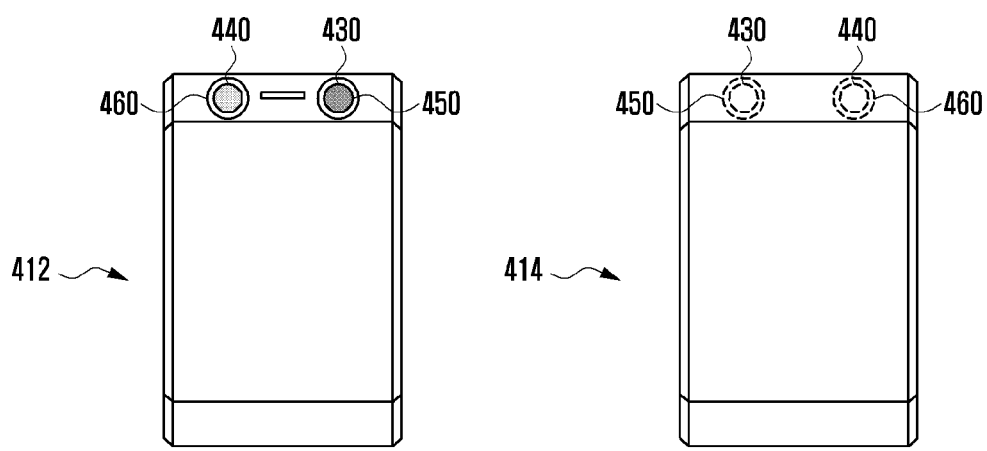

FIGS. 7A and 7B are views showing arrangement of imaging units 430 and 440 and lens units 450 and 460 of a foldable electronic device 400 including a flexible display according to various embodiments of the disclosure.

Referring to FIGS. 7A and 7B, the foldable electronic device 400 according to various embodiments may include a first imaging unit 430, a second imaging unit 440, a first lens unit 450, and a second lens unit 460.

The first lens unit 450 and/or the second lens unit 460 may include a normal standard lens, a wide-angle lens, a telephoto lens, a fish-eye lens having an angle of view of 180°, a microlens designed to enable close-up or macro photography, a zoom lens being able to sequentially change a focal distance, or a mirror lens using a mirror etc. The first lens unit 450 and/or the second lens unit 460 may further include an electro-wetting variable-focus liquid lens that can adjust the focus in accordance with an electric field.

The electro-wetting variable-focus liquid lens can adjust the focal distance thereof by changing the curvature of an interface in accordance with the equilibrium wetting condition of the interface, using an electro-wetting phenomenon. When the first lens unit 450 and/or the second lens unit 460 includes an electro-wetting variable-focus liquid lens in accordance with various embodiments, the electronic device can perform imaging in various modes by changing the focus in accordance with user's requirements.

The first imaging unit 430 and the second imaging unit 440 can take still pictures or videos. Though not shown, the first imaging unit 430 and the second imaging unit 440 each may include a lens block that is an optical system including a zoom lens, a focus lens, a diaphragm, etc.

In accordance with various embodiments, when the first imaging unit 430 or the second imaging unit 440 is combined with the first lens unit 450 or the second lens unit 460 due to folding of the electronic device, the combined lens units 450 and 460 and imaging units 430 and 440 may be arranged on the same optical axis. For example, light from an object can travel through the combined imaging units 430 and 440 after traveling through the lens units 450 and 460.

As shown in FIG. 7A, the foldable electronic device 400 according to various embodiments may include, when it is fully unfolded without folding, that is, in an unfolded state, the first imaging unit 430 and the second imaging unit 440 on a second side 420, and the first lens unit 450 and the second lens unit 460 disposed through the first side 410 and the second side 420.

If the first side 410 is divided into a first region 412 and a second region 414 with respect to an axis and the region where the first lens unit 450 is disposed is the first region 412, the second lens unit 460 may be disposed in the first region 412 through the first side 410 and the second side 420, adjacent to the first lens unit 450.

Further, as shown in FIG. 7B, when the foldable electronic device 400 according to various embodiments is fully folded with respect to an axis, that is, in a folded state, the first imaging unit 430 may be combined with the first lens unit 450 on the same optical axis and the second imaging unit 440 may be combined with the second lens unit 460 on the same optical axis.

In accordance with various embodiments, the first side 410 of the electronic device 400 in the unfolded state may mean a side including a flexible display, but another display may be included in the second side 420 disposed opposite to the first side 410 in the unfolded state, so the meaning of the first side is not limited thereto.

As shown in FIG. 7A, the electronic device 400 according to various embodiments can perform imaging in a dual camera mode using the first imaging unit 430 and the second imaging unit 440 that are disposed in the second side 420 in the unfolded state. For example, the dual camera mode-imaging of the electronic device 400 may be an operation in which two imaging units simultaneously take a picture of a single object.

For example, when the electronic device 400 performs imaging in the dual camera mode, the electronic device 400 can perform 3D-imaging or a refocusing function on a taken image. Further, in accordance with various embodiments, when the first imaging unit 430 and the second imaging unit 440 have different view angles, it is possible to simultaneously obtain images with several view angles through the dual camera mode-imaging.

As shown in FIG. 7B, the electronic device 400 according to various embodiments can perform imaging in an improved dual camera mode using the first imaging unit 430 combined with the first lens unit 450 and the second imaging unit 440 combined with the second lens unit 460 in the folded state.

For example, depending on the lens characteristics of the first lens unit 450 and the second lens unit 460, the electronic device 400 can obtain images with several view angles, can enlarge and take a picture of a far object using the optical zoom function, and can perform the refocusing function or 3D-imaging function by configuring a depth map.

The electronic device 400 according to various embodiments, though not shown, may include a third imaging unit in the first side, thereby being able to perform imaging in a self-camera mode in the unfolded state and to perform normal mode-imaging in the folded state.

Figure 8A:
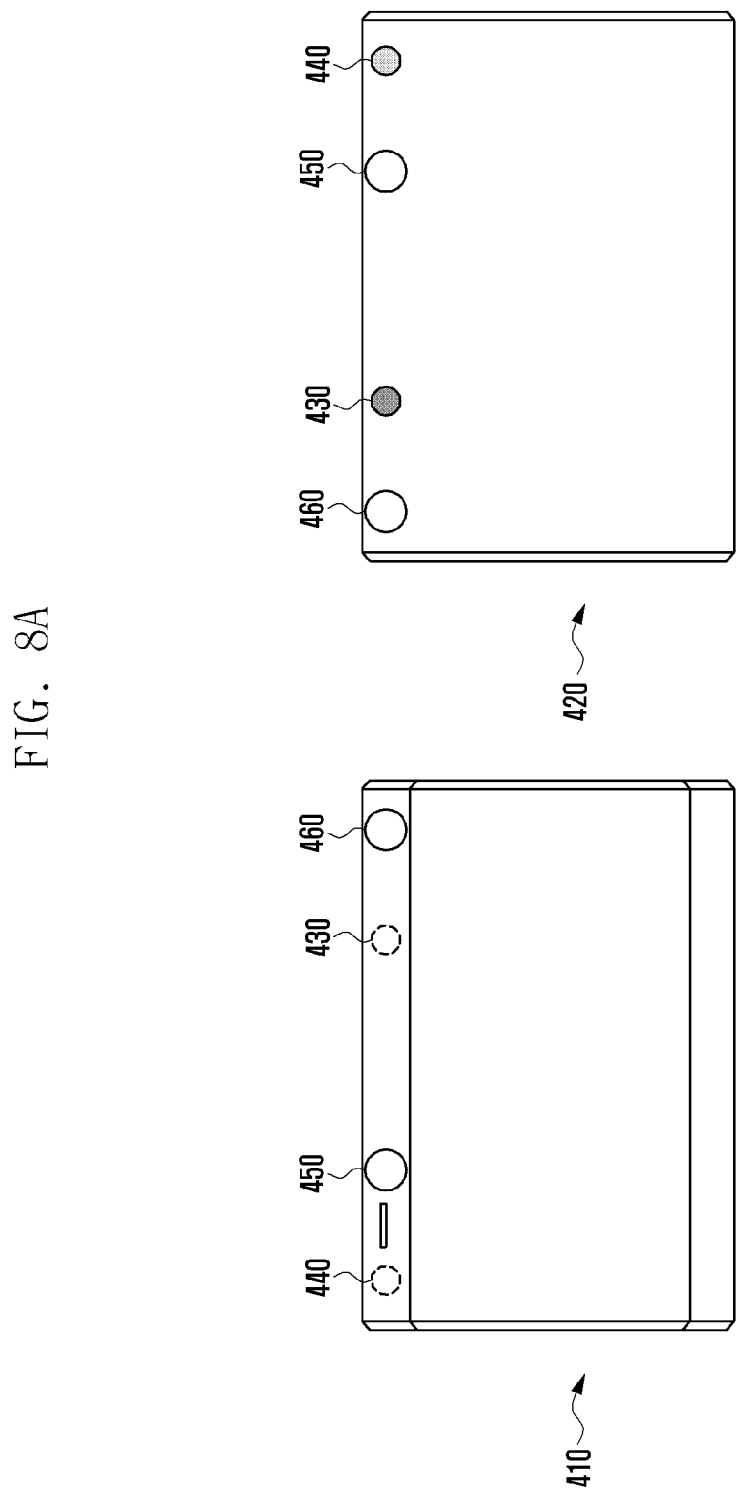
FIGS. 8A and 8B are views showing arrangement of an imaging unit and a lens unit of an electronic device according to another embodiment of the disclosure.
Figure 8B:
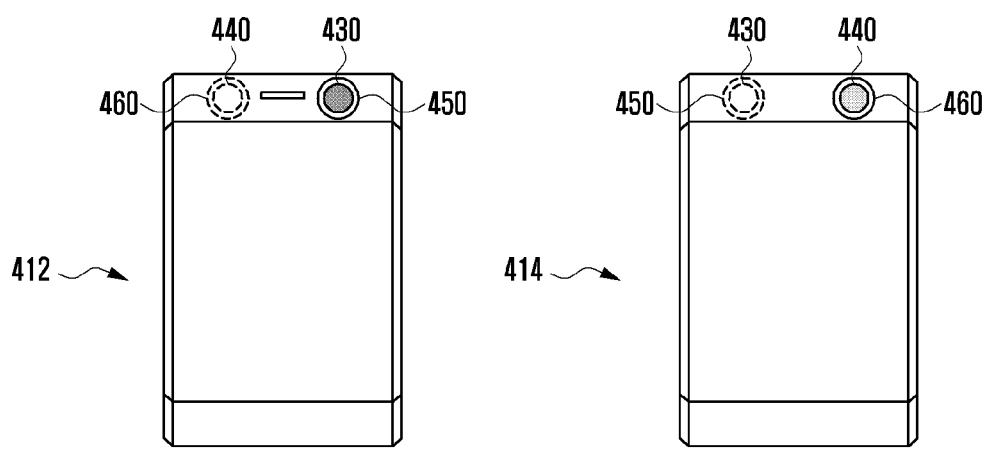

FIGS. 8A and 8B are views showing arrangement of imaging units 430 and 440 and lens units 450 and 460 of a foldable electronic device 400 including a flexible display according to another embodiment of the disclosure.

Referring to FIGS. 8A and 8B, the foldable electronic device 400 according to various embodiments may include a first imaging unit 430, a second imaging unit 440, a first lens unit 450, and a second lens unit 460.

The first lens unit 450 and/or the second lens unit 460 may include a normal standard lens, a wide-angle lens, a telephoto lens, a fish-eye lens having an angle of view of 180°, a microlens designed to enable close-up or macro photography, a zoom lens being able to sequentially change a focal distance, or a mirror lens using a mirror etc. The first lens unit 450 and/or the second lens unit 460 may further include an electro-wetting variable-focus liquid lens that can adjust the focus in accordance with an electric field.

The electro-wetting variable-focus liquid lens can adjust the focal distance thereof by changing the curvature of an interface in accordance with the equilibrium wetting condition of the interface, using an electro-wetting phenomenon. When the first lens unit 450 and/or the second lens unit 460 includes an electro-wetting variable-focus liquid lens in accordance with various embodiments, the electronic device can perform imaging in various modes by changing the focus in accordance with user's requirements.

The first imaging unit 430 and the second imaging unit 440 can take still pictures or videos. Though not shown, the first imaging unit 430 and the second imaging unit 440 each may include a lens block that is an optical system including a zoom lens, a focus lens, a diaphragm, etc.

In accordance with various embodiments, when the first imaging unit 430 or the second imaging unit 440 is combined with the first lens unit 450 or the second lens unit 460 due to folding of the electronic device, the combined lens units 450 and 460 and imaging units 430 and 440 may be arranged on the same optical axis. For example, light from an object can travel through the combined imaging units 430 and 440 after traveling through the lens units 450 and 460.

As shown in FIG. 8A, the foldable electronic device 400 according to various embodiments may include, when it is fully unfolded without folding, that is, in an unfolded state, the first imaging unit 430 and the second imaging unit 440 on a second side 420, and the first lens unit 450 and the second lens unit 460 disposed through the first side 410 and the second side 420.

If the first side 410 is divided into a first region 412 and a second region 414 with respect to an axis and the region where the first lens unit 450 is disposed is the first region 412, the second lens unit 460 may be disposed in the second region 414 through the first side 410 and the second side 420.

Further, as shown in FIG. 8B, when the foldable electronic device 400 according to various embodiments is fully folded with respect to an axis, that is, in a folded state, the first imaging unit 430 may be combined with the first lens unit 450 on the same optical axis and the second imaging unit 440 may be combined with the second lens unit 460 on the same optical axis.

In accordance with various embodiments, the first side 410 of the electronic device 400 in the unfolded state may mean a side including a flexible display, but another display may be included in the second side 420 disposed opposite to the first side 410 in the unfolded state, so the meaning of the first side is not limited thereto.

As shown in FIG. 8A, the electronic device 400 according to various embodiments can perform imaging in a dual camera mode using the first imaging unit 430 and the second imaging unit 440 that are disposed in the second side 420 in the unfolded state. For example, the dual camera mode-imaging of the electronic device 400 may be an operation in which two imaging units simultaneously take a picture of a single object.

For example, when the electronic device 400 performs imaging in the dual camera mode, the electronic device 400 can perform 3D-imaging or a refocusing function on a taken image. Further, in accordance with various embodiments, when the first imaging unit 430 and the second imaging unit 440 have different view angles, it is possible to simultaneously obtain images with several view angles through the dual camera mode-imaging.

As shown in FIG. 8B, the electronic device 400 according to various embodiments can perform imaging in a special mode using the first imaging unit 430 combined with the first lens unit 450 and the second imaging unit 440 combined with the second lens unit 460 in the folded state.

For example, the electronic device 400 can perform improved self-camera mode-imaging using the first imaging unit 430 combined with the first lens unit 450 in the first region 412 or can perform improved normal mode-imaging using the second imaging unit 440 combined with the second lens unit 460 in the second region 414.

In accordance with various embodiments, both of the first lens unit 450 and the second lens unit 460 include a fish-eye lens having an angle of view of 180°, the electronic device 400 can perform imaging that implements a view angle of 360°.

Figure 9A:
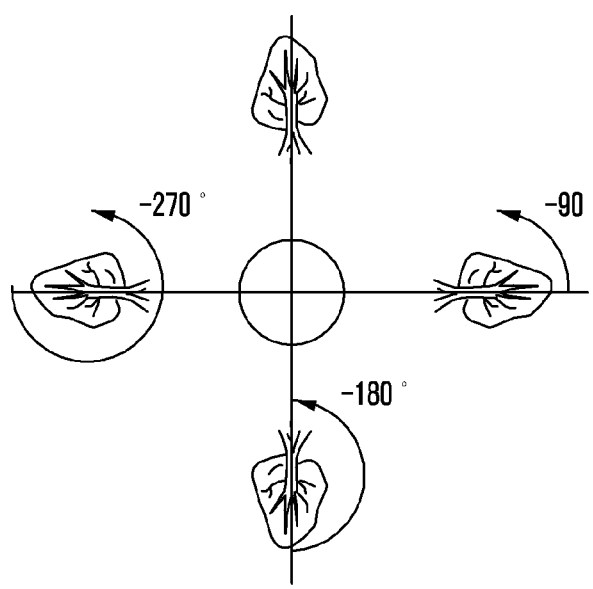
FIGS. 9A and 9B are views showing an imaging function at a view angle of 360° in a special imaging mode according to various embodiments of the disclosure.
Figure 9B:
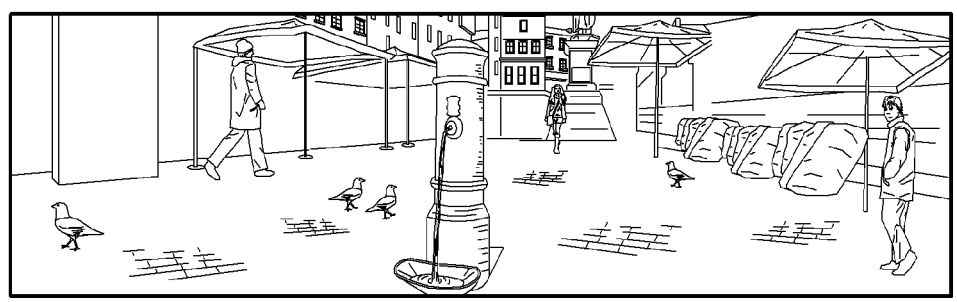

FIGS. 9A and 9B are views showing imaging results at a view angle of 360° by the electronic device 400 according to various embodiments.

As shown in FIG. 8B, when including the first imaging unit 430 and the second imaging unit 440 in the second side 420, the first lens unit 450 in the first region, and the second lens unit 460 in the second region in the unfolded state, the electronic device 400 can perform imaging at a view angle of 360° using the first imaging unit 430 combined with the first lens unit 450 and the second imaging unit 440 combined with the second lens unit 460.

For example, the electronic device 400 according to an embodiment, in the folded state, can obtain an image of a view angle of 180° through the first imaging unit 430 combined with the first lens unit 450 and can obtain an image of the other view angle of 180° through the second imaging unit 440 combined with the second lens unit 460. The electronic device 400 according to an embodiment, as shown in FIG. 9A, can obtain an imaging result showing a view angle of 360° at a time in one image by combining two obtained images of view angles of 180°.

The electronic device 400 according to another embodiment, as shown in FIG. 9B, can change an imaging result having a view angle of 360° into a panoramic image through post processing.

The electronic device 400 according to various embodiments, though not shown, may further include a third imaging unit in at least one of the first side and the second side in the folded state.

Figure 10A:
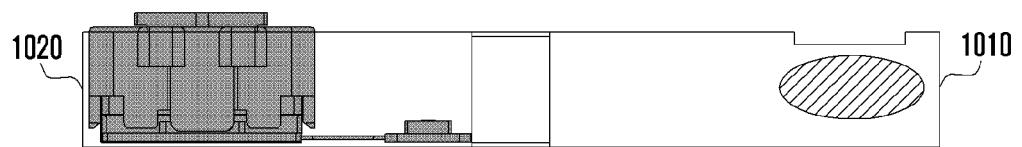

FIG. 10A is a view showing a combination structure of the imaging units 430 and 440 and the lens unit 450 and 460 of the electronic device 400 according to various embodiments.

When the imaging units 430 and 440 and the lens unit 450 and 460 are combined, if there is a space between the imaging units 430 and 440 and the lens unit 450 and 460, light leakage that causes reflection of light or focus deviation due to pushing of a lens may occur in an imaging result.

The combination structure of the imaging units 430 and 440 and the lens unit 450 and 460 according to various embodiments of the disclosure can provide a lock-in structure such that the imaging units 430 and 440 and the lens unit 450 and 460 are combined with a space therebetween.

Referring to FIG. 10A, the imaging unit 430 and 440 may have an embossed protrusive structure 1020 due to the length of the barrel of a camera that is directly associated with an imaging ability. Further, in accordance with various embodiments, the lens units 450 and 460 of the electronic device 400 may be formed in an engraved structure 1010 corresponding to the embossed protrusive structure 1020 of the imaging units 430 and 440.

For example, the end of the engraved structure 1010 of the lens units 450 and 460 may be formed narrower than the barrels of the lens unit and the end of the embossed protrusive structure 1020 of the imaging units may be formed wider than the barrel of the camera such that both ends form a lock-in structure when the imaging units 430 and 440 and the lens units 450 and 460 are combined.

FIG. 10B is a view showing in detail a combination structure of the imaging units 430 and 440 and the lens unit 450 and 460 of the electronic device 400 according to various embodiments.

Referring to FIG. 10B, the lens units 450 and 460 according to various embodiments may a ring-shaped align guide 1030 on the inner side of an engraved structure formed by connecting a housing 1011 of the lens units 450 and 460 and the barrel 1012 of the lens units 450 and 460.

Further, the embossed protrusive structure 1020 of the imaging units 430 and 440 according to various embodiments is configured by connecting a camera housing 1021 and a camera barrel 1022 and the camera barrel 1022 is formed with a narrow end in an outer ring shape to form the lock-in structure, as shown in FIG. 10B, so a space for the align guide 1030 of the lens units can be provided.

When the electronic device 400 is folded and the imaging units 430 and 440 and the lens units 450 and 460 are combined, the align guide 1030 can push the portion being in contact with the barrel 1022 of the camera, thereby being able to bring the portion in close contact with the barrel. To this end, the align guide 1030 may be made of rubber.

For example, when the imaging units 430 and 440 and the lens units 450 and 460 are combined, the align guide 1030 can push spaces 1041 and 1042 being in contact with the camera barrel 1022 due to the elasticity of the rubber. For example, the align guide 1030 can maintain a predetermined distance between the imaging units 430 and 440 and the lens units 450 and 460 are combined due to the force that pushes the space 1041 and can secure constant concentricity of the lens units 450 and 460 due to the force that pushes the space 1042.

Figure 11:
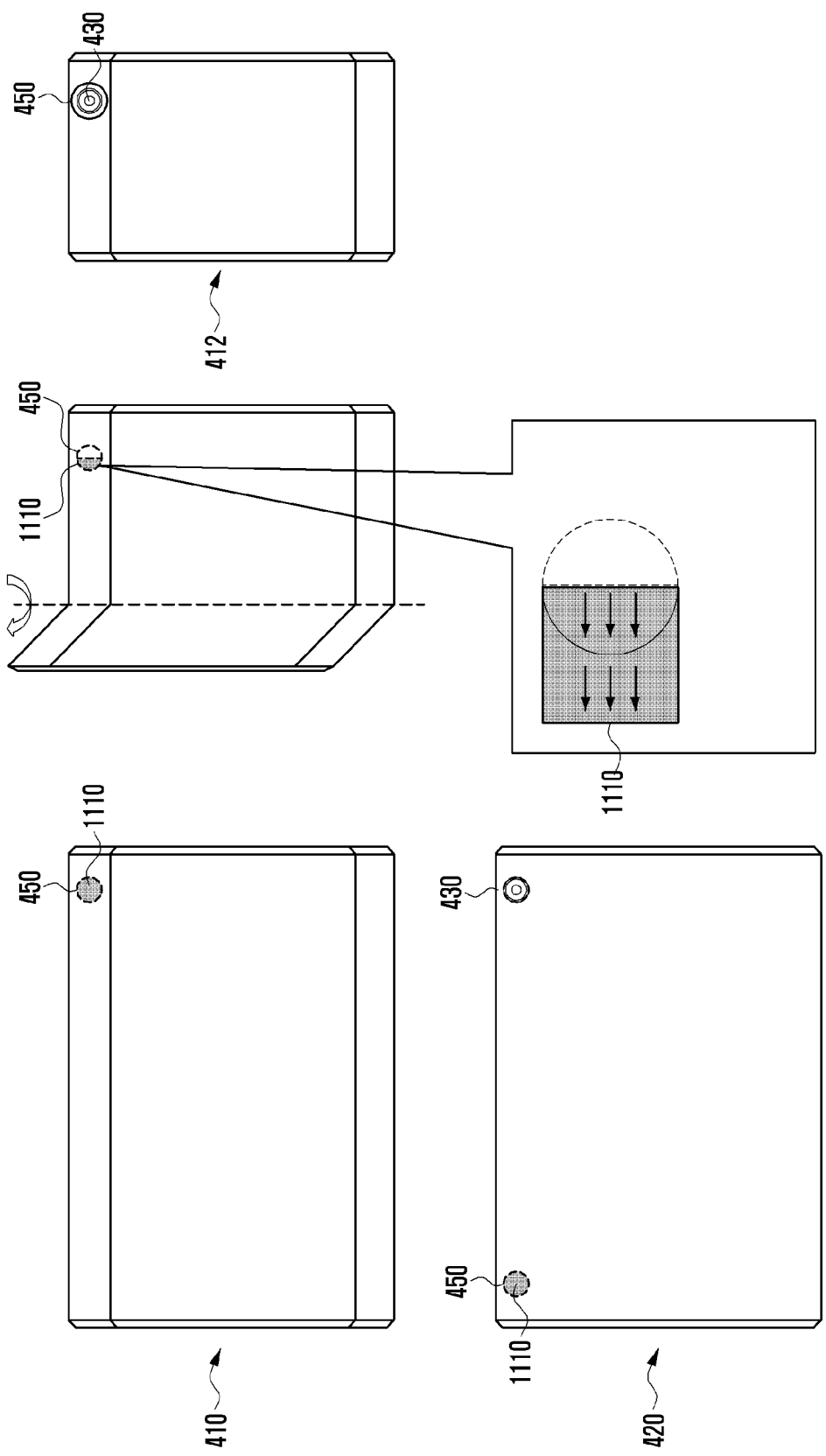
FIG. 11 is a view showing the operation of a shutter of a lens unit according to various embodiments of the disclosure.

FIG. 11 is a view showing the operation of a shutter 1110 for opening/closing the lens unit 450 of the electronic device 400 according to various embodiments.

Referring to FIG. 11, when the electronic device 400 according to various embodiments is fully unfolded without folding, that is, in the unfold state, the lens unit 450 can be fully closed by the shutter 1110 not to be shown to the outside in both of the first side 410 and the second side 420 disposed opposite to the first side 410.

The lens unit 450 in the first side 410 and the second side 420 can be partially closed by the shutter 1110, depending on the degree of folding of the electronic device 400 according to various embodiments, when the electronic device 400 is partially formed with respect to an axis.

The more the electronic device 400 according to various embodiments is folded, the more the lens unit 450 can be opened by the shutter 1110, and when the electronic device 400 is fully folded with respect to an axis, that is, in the folded state, the lens unit 450 can be fully opened by the shutter 1110.

Figure 12A:
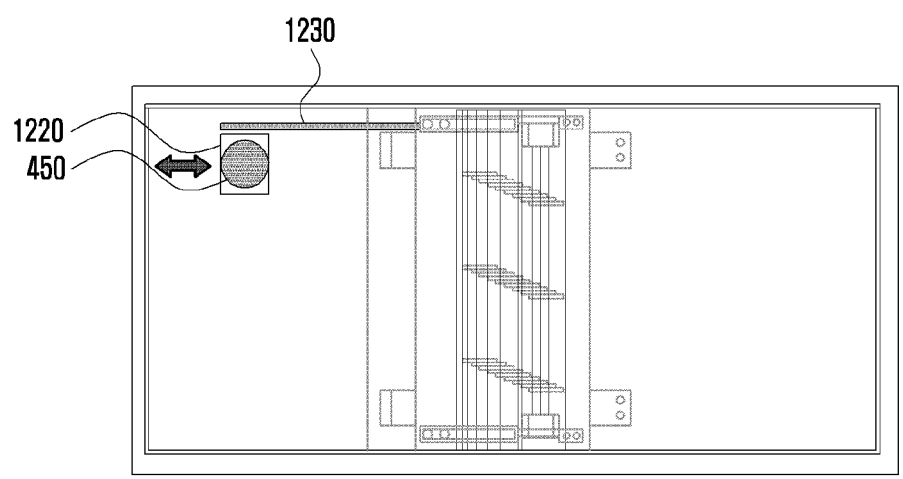
FIGS. 12A and 12B are front and side perspective views showing the operation of the shutter of the lens unit according to various embodiments of the disclosure.
Figure 12B:
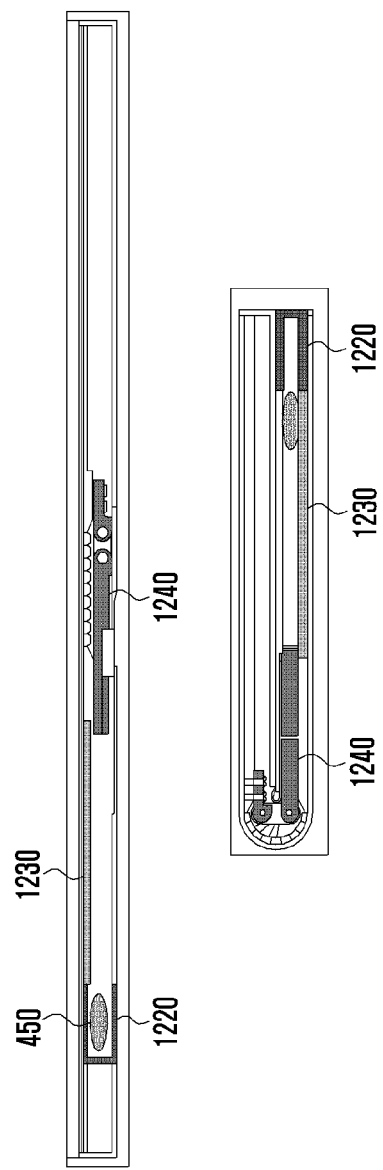

FIGS. 12A and 12B are views showing the operation principle of the shutter 1110 of the electronic device 400 according to various embodiments.

In detail, FIG. 12A is a perspective view showing the inside of the electronic device 400 according to various embodiments in the unfolded state without folding and FIG. 12B is a perspective side view of the electronic device 400 in the unfolded state and the folded state.

Referring to FIGS. 12A and 12B, the electronic device 400 according to various embodiments may include a shutter 1220 in a housing, a hinge 1240, and a link 1230 connecting the shutter 1220 and the hinge 1240 to each other.

The shutter 1220, as shown in FIG. 12B, may be configured in a double-side integration type such that the lens unit 450 is not shown in both of a front face 410 and a rear face 420 in the unfolded state when the electronic device 400 is fully unfolded without folding.

The shutter 1220 according to various embodiments may be connected to the hinge 1240 by the link 1230. The hinge 1240 according to various embodiments can rotate the foldable electronic device 400 such that the electronic device 400 can be at least partially folded with respect to an axis.

In accordance with various embodiments, the shutter 1220 connected to the hinge 1240 can horizontally moved to the left and right in the same line as the lens unit 450, depending on the degree of folding of the electronic device.

For example, when the electronic device 400 is fully unfolded, the shutter 1220 can be positioned to fully overlap the lens unit 450, and when the electronic device 400 is rotated, the shutter 1220 can move away from the rotational axis. Further, when the electronic device 400 is fully folded with respect to an axis, the shutter 1220 can fully open the lens unit 450 at a position where it does not overlap the lens unit 450.

Though not shown, the shutter 1110 can open/close the lens unit 450 in accordance with predetermined conditions regardless of the degree of folding of the electronic device 400 and the operation of the shutter 1220 is not limited to the embodiment shown in FIG. 12.

Each of the components of the electronic device according to the present disclosure may be implemented by one or more components and the name of the corresponding component may vary depending on a type of the electronic device. In various embodiments, the inspection apparatus may include at least one of the above-described elements. Some of the above-described elements may be omitted from the electronic device, or the inspection apparatus may further include additional elements. Further, some of the components of the electronic device according to the various embodiments of the present disclosure may be combined to form a single entity, and thus, may equivalently execute functions of the corresponding elements prior to the combination.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. When the command is executed by one or more processors (for example, the processor 120), the one or more processors may execute a function corresponding to the command. The computer-readable storage medium may, for example, be the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added.

According to various embodiments of the disclosure, in a storing medium that keeps instructions, the instructions are set to make at least one processor perform at least one operation when the instructions are executed by the at least one processor. Further, the at least one operation may include an operation that obtains an image and an operation that outputs an image analysis result that analyzes the obtained image and a message created on the basis of and additional information.

The embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

The invention claimed is:

1. A foldable electronic device that has a first side including a flexible display and a second side disposed opposite to the first side and can be at least partially folded with respect to an axis, the electronic device comprising:
   a lens unit disposed in a partial region of the first side not including the flexible display through the first side and the second side;
   a first imaging unit disposed adjacent to a first region in which the lens unit is disposed, when the first side is divided into the first region and a second region with respect to the axis; and
   a second imaging unit disposed in at least a partial region of the second side and combined with the lens unit on the same optical axis when the electronic device is folded with respect to the axis.

2. The electronic device of claim 1, wherein the lens unit includes at least one of an electro-wetting variable-focus liquid lens, a wide-angle lens, a telephoto lens, a microlens, and a fish-eye lens.

3. The electronic device of claim 1, wherein the second imaging unit includes a camera barrel with an end having an embossed protrusive structure protruding from the first side, the lens unit includes a lens barrel having an engraved structure corresponding to the end having an embossed protrusive structure of the camera barrel and includes a ring-shaped align guide formed on the inner side of the lens barrel having an engraved structure, and
   when the electronic device is folded with respect to the axis, the camera barrel of the second imaging unit and the lens barrel of the lens unit form a lock-in structure by the align guide.

4. The electronic device of claim 1, further comprising a shutter disposed through the first side and the second side to be able to close the lens unit,
   wherein the shutter is positioned to cover the lens unit in both of the first side and the second side when the electronic device is fully unfolded, and is positioned to open the lens unit in both of the first side and the second side when the electronic device is fully folded with respect to the axis.

5. The electronic device of claim 4, further comprising a hinge disposed in the electronic device to enable the electronic device to rotate with respect to the axis, wherein the shutter is connected to the hinge, so the shutter opens/closes the lens unit in the first side and the second side when the electronic device is rotated.

6. The electronic device of claim 1, further comprising a third imaging unit in the second region of the first side.

7. A foldable electronic device that has a first side including a flexible display and a second side disposed opposite to the first side and can be at least partially folded with respect to an axis, the electronic device comprising:
   a first lens unit disposed in a partial region of the first side not including the flexible display through the first side and the second side;
   a second lens unit disposed through the first side and the second side, adjacent to a first region in which the first lens unit is disposed, when the first side is divided into the first region and a second region with respect to the axis;
   a first imaging unit disposed in at least a partial region of the second side and combined with the first lens unit on the same optical axis when the electronic device is folded with respect to the axis; and
   a second imaging unit disposed in another region of the second side where the first imaging unit is disposed, and combined with the second lens unit on the same optical axis when the electronic device is folded with respect to the axis.

8. The electronic device of claim 7, wherein the first lens unit and the second lens unit include at least one of an electro-wetting variable-focus liquid lens, a wide-angle lens, a telephoto lens, a microlens, and a fish-eye lens.

9. The electronic device of claim 7, wherein the first imaging unit and the second imaging unit include a camera barrel with an end having an embossed protrusive structure protruding from the second side,
   the first lens unit and the second lens unit include a lens barrel having an engraved structure corresponding to the end having an embossed protrusive structure of the camera barrel and include a ring-shaped align guide formed on the inner side of the lens barrel having an engraved structure, and
   when the electronic device is folded with respect to the axis, the first imaging unit combined with the first lens unit and the second imaging unit combined with the second lens unit form a lock-in structure by the align guide.

10. The electronic device of claim 7, further comprising shutters disposed through the first side and the second side to be able to close the first lens unit and the second lens unit,
   wherein the shutters are positioned to close the first lens unit and the second lens unit in both of the first side and the second side when the electronic device is fully unfolded, and are positioned to open the first lens unit and the second lens unit in both of the first side and the second side when the electronic device is fully folded with respect to the axis.

11. The electronic device of claim 10, further comprising a hinge disposed in the electronic device to enable the electronic device to rotate with respect to the axis,
   wherein the shutters are connected to the hinge, so the shutters open/close the first lens unit and the second lens unit in the first side and the second side when the electronic device is rotated.

12. A foldable electronic device that has a first side including a flexible display and a second side disposed opposite to the first side and can be at least partially folded with respect to an axis, the electronic device comprising:
   a first lens unit disposed in a partial region of a first region not including the flexible display through the first side and the second side when the first side is divided into the first region and a second region with respect to the axis;
   a second lens unit disposed through the first side and the second side in a partial region of the second region not including the flexible display;
   a first imaging unit disposed in at least a partial region of the second side and combined with the first lens unit on the same optical axis when the electronic device is folded with respect to the axis; and
   a second imaging unit disposed in another region of the second side here the first imaging unit is disposed, and combined with the second lens unit on the same optical axis when the electronic device is folded with respect to the axis.

13. The electronic device of claim 12, wherein the first lens unit and the second lens unit include at least one of a fish-eye lens being able to have an angle of view of 180° and an electro-wetting variable-focus liquid lens.

14. The electronic device of claim 12, wherein the first imaging unit and the second imaging unit include a camera barrel with an end having an embossed protrusive structure protruding from the second side,
   the first lens unit and the second lens unit include a lens barrel having an engraved structure corresponding to the end having an embossed protrusive structure of the camera barrel and include a ring-shaped align guide formed on the inner side of the lens barrel having an engraved structure, and
   when the electronic device is folded with respect to the axis, the first imaging unit combined with the first lens unit and the second imaging unit combined with the second lens unit form a lock-in structure by the align guide.

15. The electronic device of claim 12, further comprising shutters disposed through the first side and the second side to be able to close the first lens unit and the second lens unit,
   wherein the shutters are positioned to close the first lens unit and the second lens unit in both of the first side and the second side when the electronic device is fully unfolded, and are positioned to open the first lens unit and the second lens unit in both of the first side and the second side when the electronic device is fully folded with respect to the axis.

* * * * *